Nov. 15, 1960    J. L. RUSSELL    2,960,586
ELECTRICAL CONTACTOR

Filed Nov. 7, 1958    2 Sheets-Sheet 1

United States Patent Office 2,960,586
Patented Nov. 15, 1960

2,960,586

ELECTRICAL CONTACTOR

John L. Russell, Naugatuck, Conn., assignor to The Bristol Company, Waterbury, Conn., a corporation of Connecticut Filed Nov. 7, 1958, Ser. No. 772,569

6 Claims. (Cl. 200—90)

This invention relates to electrically actuated contactors and, more especially, to a form of contactor commonly called a "chopper" adapted for synchronously interrupting electric circuits at a relatively high rate.

Modern usage of devices of this class, for example in the instrumentation of aircraft and missiles, has imposed the most rigorous requirements not only in the direction of high speeds of operation, but also with respect to minimum size and weight, immunity from effects of shock and vibration, more effective shielding from external electromagnetic and electrostatic fields, minimizing of thermal effects, and ability to operate without significant contribution of electrical "noise" to the circuits in which they are used. I have disclosed and claimed in a copending application filed June 14, 1955, Serial No. 515,373, now U.S. Patent No. 2,866,028, assigned to the assignee of the present application, a contactor device of this class in which considerable improvement along the aforesaid lines has been accomplished. I have found that further substantial unique improvements as well as advantages are attained in accordance with a copending application, filed Nov. 22, 1957, Ser. No. 698,208, of which the present application is a continuation-in-part.

It is a principal object of this invention to provide a contacting device of small and compact form especially well suited for use in systems wherein it is essential that the size and weight of component parts be minimized, and achieving a high degree of magnetic and electrical efficiency.

It is a further object to provide a device of the above class having balanced magnetic flux paths enclosing the armature and the energizing coil in a manner to divert impinging external electromagnet field flux, thereby effectively eliminating biasing effects on the working system and avoiding dependence on magnetically shielding enclosures for accomplishing this purpose.

It is a still further object to provide a miniaturized, hermetically-sealed device of the above class in which the moving element is of composite design so that flux paths through it can be removed from proximity to electrical output terminals thereby reducing electromagnetic interference in output circuits.

Further objects as well as advantages of my invention will be apparent from the following description and the accompanying drawings of an exemplary embodiment thereof, in which Figure 1 is a vertical cross-sectional view of a contactor constructed according to my invention;

Figure 1:
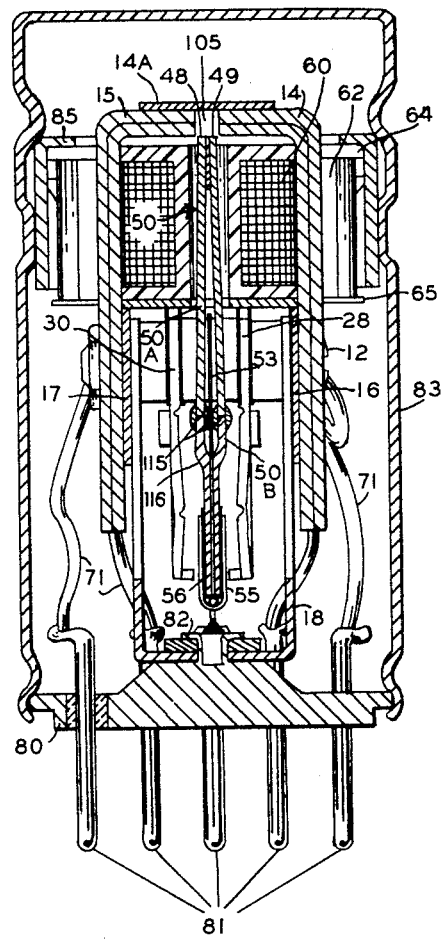
Figure 2:
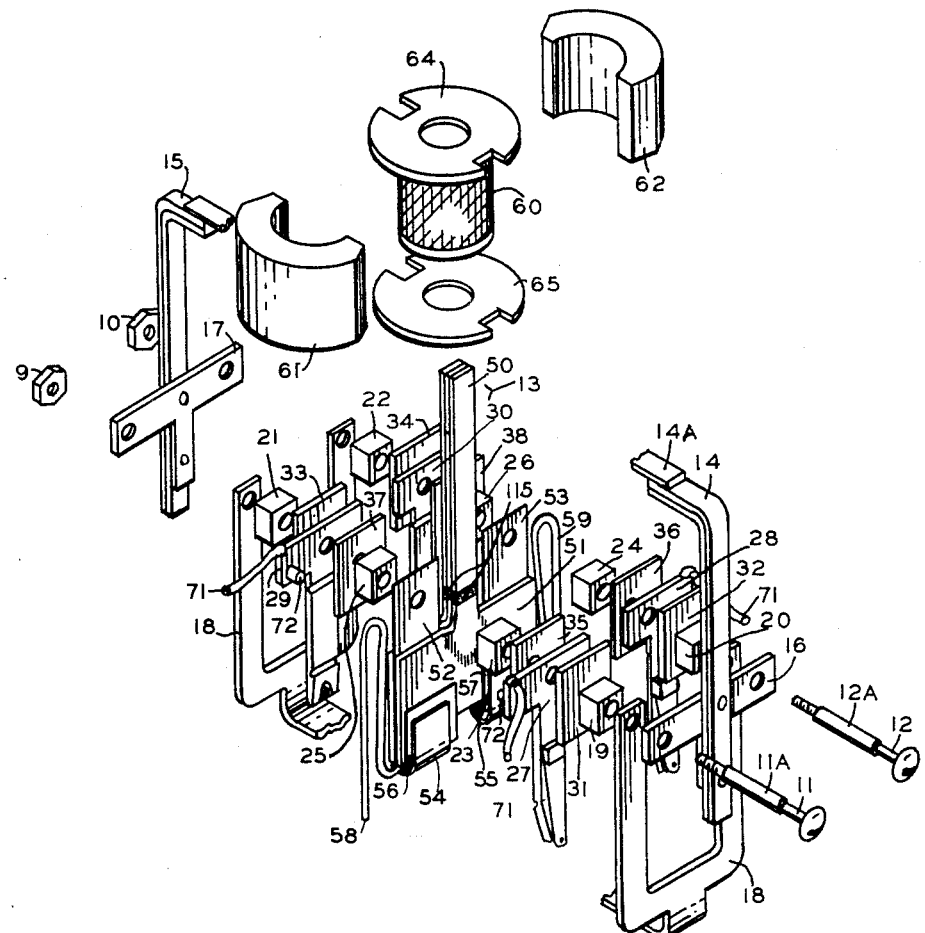
Figure 2 is an isometric exploded view of the parts thereof.

Referring now to the drawings, the structure is assembled stack-wise on two bolt members 11 and 12. Insulating sleeves 11A and 12A provide for electrical isolation of various members from the bolts and on assembly, the various members are retained by nuts 9 and 10 applied to these bolts. The stacked elements are disposed on the mounting bolts symmetrically on either side of a central armature member 13. The outer elements of the stack are pole-pieces 14 and 15 made of laminated transformer iron or similar magnetic material. Pole-pieces 14 and 15 are L-shaped and are mounted inverted and juxtaposed so that the horizontal (as viewed in Figure 1) portions form a small air gap 105 with which the upper end of the armature 13 is in close proximity. The vertical portions extend approximately the full length of the armature. Riveted to pole-pieces 14 and 15 are cross arms 16 and 17 of nonmagnetic material drilled to receive the insulated mounting bolts 11 and 12 and fix the relative positions of the stacked elements. Next in order in the stack is a U-shaped, double-forked, mounting bracket 18, the forked elements, shown broken apart in Figure 2, being actually joined at the bottom of the bracket as shown in Figure 1 and having a riveting hole therein for fastening to a base member as described hereinafter. Spacer members 19, 20, 21, 22 and also 23, 24, 25, 26 serve to locate fixed contact assemblies 27, 28, 29, 30 with respect to the other parts of the structure, and insulating washers 31 to 38, inclusive, of thin sheet mica or similar insulating material, serve to isolate these contact members electrically from the rest of the structure.

Figure 4:
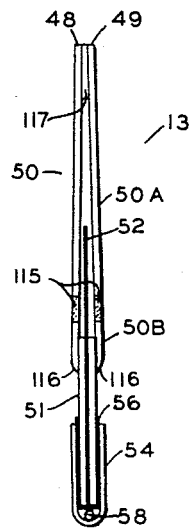
Figure 4 is a side elevational view of the armature member of Figure 3.
Figure 3:
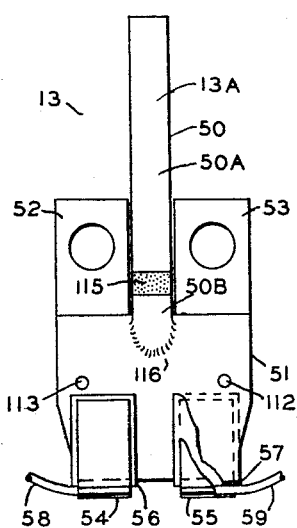
Figure 3 is a detailed front elevational view of the armature member.

The centrally disposed movable armature member 13 comprises two identical members 48, 49 which, as most clearly shown in Figure 3, are generally inverted T-shaped members which together form an elongated stem portion 50 and a broadened crosspiece 51. Rivets 112 and 113 serve to secure together the portions of T-shaped members 48 and 49 forming the crosspiece 51 and also serve to secure, in sandwiched relation between the end portions of the cross-piece 51, two resilient members forming projections or tabs 52 and 53. Tabs 52 and 53 protrude from the upper side of each arm of the crosspiece 51 and extend in close spaced relation along opposite sides of the stem portion 50. The tabs 52 and 53 are drilled for inclusion into the bolted stack, and they form pivot points or flexure members for the movable armature member. It is to be noted that where the stem portion 50 merges into the crosspiece portion 51, semi-circular offsets 116 are formed in the metal of each of the T-shaped members 48, 49 for the purpose of providing stiffness to the stem portion 50. In the absence of such stiffening, the armature 13 can flex to an appreciable degree with the result that external vibration may cause a "whipping" action which may produce erratic action of the contacts. The upper portions of T-shaped members 48, 49 are spot-welded together, the space between them being filled out by means of a spacer 117.

Each of the members 48 and 49 forming the armature 13 is fabricated from two different kinds of materials which are united at a juncture 115. The portions 50A of stem portion 50 above the juncture 115 are formed from a ferromagnetic material, such as transformer iron or the like. The portions 50B of the stem portion 50 below the juncture 115 as well as the portions forming the crosspiece 51 which are integral therewith are formed of a nonmagnetic material, such as an austenitic stainless steel. The juncture 115 of the two dissimilar materials forming members 48 and 49 may be effected by butt welding or brazing the sections, by lap welding using spot or projection resistance welding, or by lap-joint brazing or soldering. The location of the junctures 115 along the armature members 48 and 49 is such that it is outside of the energizing coil with which, as will be more fully pointed out hereinafter, the armature member is associated. Furthermore, the junctures 115 are adjacent to the transverse axis about which the armature structure pivots due to the pivot points formed by tabs 52 and 53.

On each of the outer portions of the crosspiece 51 are fixed contact members 54 and 55 formed of suitable contact materials, preferably of the precious-metal class. These are of a U-shape, bent over the edge of the armature crosspiece 51 so as to expose a continuous contact surface on both sides of the armature. The contact surface of contact member 54 is adapted to make contact with either one of oppositely disposed fixed contacts 27, 29 juxtaposed thereto. Similarly, the contact surface of contact member 55 is adapted to make contact with either one of oppositely disposed fixed contacts 28, 30 juxtaposed thereto. The contact members 54 and 55 are insulated from the armature and each other by interposed barrier members 56 and 57 of insulating material, in each case, the contact and insulator being cemented together and to the armature. Connections between the moving contacts 54 and 55 and fixed circuit elements are made through resilient looped wires 58 and 59, respectively. On assembly, the upper loops of these wires are clamped between insulating pins 72, thereby preventing damaging vibrations in unsupported connecting leads.

Energizing or "driving" coil 60 fits over stem portion 50 of the armature 13, the center hole therein permitting freedom of movement of this stem as determined by pivot members 52 and 53. On assembly, the coil rests on the stacked elements, with a thin, metallic, electrostatic shield member 65 interposed, and is enclosed on two sides within the upper portions of the pole-pieces 14 and 15. The coil form on which the coil 60 is wound is formed with an upper end 64 of enlarged diameter with holes through which connecting leads may be threaded and with cut-out portions to receive the pole pieces 14 and 15 on assembly.

Permanent magnets 61 and 62 of C-shape in cross section are disposed in the assembly with like poles juxtaposed, enclosing the exposed portions of the energizing coil 60, and making physical contact with the edges of the upper portions of members 14 and 15.

A strap member 14A of non-magnetic material joins the upper ends of the two pole pieces 14 and 15 for the purpose of fixing the dimensions of a short air gap 105 formed by the juxtaposition of the polar members at this point. This strap is riveted or welded to the pole pieces and is of sufficient resilience to permit bending as required in assembly operations.

As pointed out hereinabove, in the double-pole, double-throw embodiment under consideration, there are two sets of fixed contacts: one, the pair of contact assemblies 27 and 29; and, the other, the pair 28 and 30. These are identical in form and symmetrically placed in the stack assembly as shown. The contact assemblies of each pair are placed on opposite sides of the armature 51 and separated from it by the spacers 24 and 26 and 23 and 25, respectively. Insulators 32 and 36, 34 and 28, 31 and 35, and 33 and 37, isolate electrically the fixed contacts from the rest of the structure. The bolt 12 and insulating sleeve 12A holds the assembly in operative relation as shown.

As shown in Figure 1, the assembled structure is preferably provided with a hermetically sealed enclosure which includes a plug-in bayonet type base member 80 having insulated lead-ins 81 of conventional design. Mounting bracket 18 holding the contactor structure is fixed to base 80 by a rivet 82. Enclosure 83 envelopes the structure and is soldered or otherwise sealed to the base member 80. Since shielding from external fields is provided for by other means hereinafter more fully described, the enclosure may be of a nonmagnetic material to provide solely for hermetic sealing of the device. The base 80 may be of metal through which the conducting pins 81 are sealed by glass, ceramic or other insulating material.

A resilient retaining ring member 85 placed between the top of the mount assembly and the enclosure member 83 holds the contactor structure in fixed relation to the enclosure.

In operation, the leads of coil 60 are connected to a suitable source of A.-C. current. Parallel magnetic paths of low reluctance, one formed by pole-piece 14 and the other by pole-piece 15, lead from the permanent magnets 61 and 62 to two air gaps one numbered 105 in Figure 1 and formed by the horizontal portions of the polar members 14 and 15 with relation to the proximate upper end of the armature and the other formed by the exposed portion of the ferromagnetic part of the armature and the adjacent portions of the polar members 15 and 16. The movable armature 13 is adapted for limited oscillation about an axis established by the flexure pivots 52 and 53.

Only the air gap 105 is effective in producing motion of the armature. The short ferromagnetic path in the armature results in effectively establishing air gaps of substantially constant length between the armature at or near the point of the junctions 115 (in juxtaposition to the pivot point of the system) and the adjacent portions of the polar members 14, 15. At this point the movement of the armature is at or near a minimum; thus the length of the air gap is practically constant and, thereby, there is substantially no force contributed to affect the movement of the armature. Although armature 13 is mechanically continuous and extends into close proximity with the base of the enclosure and lead-ins 81, the magnetic portion of the armature is relatively remote therefrom. This provides an important advantage where, as in the present instance, the base of the hermetic enclosure is formed of ferromagnetic material.

A criterion of value of a contactor, or "chopper" of this class is the degree of freedom from electrical voltages, i.e., "noise," induced into the contact circuits, one source of which is that arising from magnetic flux of a varying nature linking the paths formed by the conductor of the contact circuits. The voltage induced is produced according to the well-known relationship $E = K d\phi/dt$, which states simply that the induced voltage is proportional to the rate of change of flux with time. The flux in this case may have its origin in the A.-C. current in the driving coil 60, or in variations in field flux (from the permanent magnets, 61 and 62) caused by the normal movements of the armature.

In the miniaturized sealed unit under consideration, hermetic sealing is facilitated by using terminal headers sealed into base members of ferromagnetic material, as, for example, base 80 (Figure 1) in which are embedded in ceramic seals the terminals 81. The requirements of small size bring the end of the armature into close proximity to the base and the terminals. With the ferromagnetic portion of the armature removed from the vicinity of the base and terminals, the reluctance of flux paths linking the contact circuits is increased several times as compared to the condition in units hitherto available wherein the ferromagnetic armature extends into close proximity to the base and lead-ins with the result that the flux lines from the magnetic circuit elements passed into the header base and were carried in paths tending to link the contact circuits. The reluctance of these paths is relatively low in compact designs due to the small air space, thereby aggravating the induction problem.

A further advantage of my contactor lies in its characteristic of minimum phase lag between the coil voltage and contact action. I have observed that as a result of the reduction in the lengths of the ferromagnetic circuit, the net coil inductance is reduced, whereby the phase lag is reduced between coil voltage and coil current. In addition, the armature functions mechanically as a one-piece member, statically balanced about a pivot axis and thus is essentially unaffected by position, shock or high accelerations.

The spurious effect of impinging external electromagnetic fields are dealt with by favorably locating the magnetic circuit elements with respect to the energizing coil and the armature, the coil being essentially surrounded, and the armature paralleled thereby. In particular, there are provided low reluctance paths in shunt relation to the ends of the armature which thus reduce the tendency of the spurious flux values to flow lengthwise through the armature and produce unsymmetrical biasing effects thereupon. Necessity for further enclosure by electromagnetic shielding is thus avoided with the concomitant benefit of avoiding the weakening effect on the permanent magnets of additional ferromagnetic shielding members. Permanent enclosure may be accomplished by using nonmagnetic materials.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

What is claimed is:

1. An electrically actuated contacting device, comprising a polar structure defining spaced first and second gaps, a movable contact, a pair of stationary contacts each adjacent to and in position to be engaged by said movable contact upon displacement of the latter, said contacts being spaced from said gaps on the side of said second gap away from said first gap, a pair of elongated members extending in mutually juxtaposed relation intermediate said first gap and said movable contact and through said second gap and forming a unitary armature for shifting said movable contact between said stationary contacts, means for impressing a variable magnetomotive force longitudinally along said armature and including a winding encircling a portion of each of said elongated members intermediate said first and second gaps and remote from said movable contact, the portions of said elongated members encircled by said winding and intermediate said gaps being ferromagnetic, the remaining portions of each of said elongated members being nonmagnetic and joined to said ferromagnetic portions at a juncture adjacent to said winding, said nonmagnetic portions extending from said juncture toward said movable contact, said junctures being substantially aligned one with the other and adjacent to said second gap, means supporting said armature for limited displacement about a transverse axis adjacent to said junctures so that the portion of said armature adjacent to said first gap is displaceable relative thereto, and means for producing a constant magnetic field in said gaps, whereby the effective length of said second gap on opposite sides of said junctures remains substantially constant when said armature is displaced about its said transverse axis and relative to said first gap.

2. An electrically actuated contacting device, comprising a hermetic envelope including a base, lead-ins insulatively sealed through said base, a polar structure supported on said base and defining first and second gaps spaced from said base, a movable contact, a pair of stationary contacts each adjacent to and in position to be engaged by said movable contact upon displacement of the latter, said contacts being adjacent to said base and spaced from said gaps on the side of said second gap away from said first gap, means connecting said contacts with said lead-ins, a pair of elongated members extending in mutually juxtaposed relation intermediate said first gap and said movable contact and through said second gap and forming a unitary armature for shifting said movable contact between said stationary contacts, means for impressing a variable magnetomotive force longitudinally along said armature and including a winding encircling a portion of each of said elongated members intermediate said first and second gaps and remote from said movable contact, the portions of said elongated members encircled by said winding and intermediate said gaps being ferromagnetic, the remaining portions of each of said elongated members being nonmagnetic and joined to said ferromagnetic portions at a juncture adjacent to said winding, said nonmagnetic portions extending from said juncture toward said movable contact, said junctures being substantially aligned one with the other and adjacent to said second gap, means supporting said armature for limited displacement about a transverse axis adjacent to said junctures so that the portion of said armature adjacent to said first gap is displaceable relative to said gap, and means for producing a constant magnetic field in said gaps, whereby the effective length of said second gap on opposite sides of said junctures remains substantially constant when said armature is displaced about its said transverse axis and relative to said first gap.

3. An electrically actuated contacting device, comprising a hermetic envelope including a ferromagnetic base, lead-ins insulatively sealed through said base, a polar structure supported on said base and defining first and second gaps spaced from said base, a movable contact, a pair of stationary contacts each adjacent to and in position to be engaged by said movable contact upon displacement of the latter, said contacts being adjacent to said base and spaced from said gaps on the side of said second gap away from said first gap, means connecting said contacts with said lead-ins, a pair of elongated members extending in mutually juxtaposed relation intermediate said first gap and said movable contact and through said second gap and forming a unitary armature for shifting said movable contact between said stationary contacts, means for impressing a variable magnetomotive force longitudinally along said armature and including a winding encircling a portion of each of said elongated members intermediate said first and second gaps and remote from said movable contact, the portions of said elongated members encircled by said winding and intermediate said gaps being ferromagnetic, the remaining portions of each of said elongated members being nonmagnetic and joined to said ferromagnetic portions at a juncture adjacent to said winding, said nonmagnetic portions extending from said juncture toward said movable contact, said junctures being substantially aligned one with the other and adjacent to said second gap, means supporting said armature for limited displacement about a transverse axis adjacent to said junctures so that the portion of said armature adjacent to said first gap is displaceable relative to said gap, and means for producing a constant magnetic field in said gaps, whereby the effective length of said second gap on opposite sides of said junctures remains substantially constant when said armature is displaced about its said transverse axis and relative to said first gap.

4. An electrically actuated contacting device, comprising a hermetic envelope including a ferromagnetic base, lead-ins insulatedly sealed through said base, a U-shaped mounting bracket in said envelope having its base portion connected to said ferromagnetic base and having a pair of oppositely disposed arms extending away from said ferromagnetic base, a pair of inverted L-shaped polar members connected along longitudinal portions thereof to said mounting bracket and with the transverse portions thereof presented towards each other in close spaced juxtaposed relation to define a gap, a movable contact, a pair of stationary contacts each adjacent to and in position to be engaged by said movable contact upon displacement of the latter, means connected to said mounting bracket and supporting said stationary contacts adjacent to said ferromagnetic base, means conductively connecting said contacts with said lead-ins, a pair of elongated members extending in mutually juxtaposed relation from adjacent said gap towards said ferromagnetic base and forming a unitary armature, said movable contact being connected to the end of said armature presented towards said ferromagnetic base, means for impressing a variable magnetomotive force lognitudinally of said armature and including a winding encircling a portion of each of said elongated members extending adjacent to said gap and remote from said movable contact, the portions of said elongated members encircled by and closely adjacent to said winding being ferromagnetic, the remaining portions of each of said elongated members being nonmagnetic and joined to said ferromagnetic portions at a juncture adjacent to said winding, said movable contact being supported on said armature adjacent to the ends of said nonmagnetic portions of said elongated members remote from said junctures, means supporting said armature for limited displacement about a transverse axis adjacent to said junctures so that the portion of said armature adjacent to said gap is displaceable relative thereto and said movable contact is shiftable between said stationary contacts, said junctures being aligned one with the other, said polar members defining a second gap adjacent to the ends of the ferromagnetic portions of said elongated members at said junctures, and means for producing a constant magnetic field in said gaps, whereby the effective length of said second gap on opposite sides of said junctures remains substantially constant when said armature is displaced about its said transverse axis and relative to said first named gap.

5. In an electrically actuated contacting device, means for producing a substantially constant magnetic field, an elongated armature member, elongated low reluctance polar structures defining a gap supported in opposed spaced relation along opposite sides of said armature member and juxtaposed to said constant magnetic field producing means between the latter and said armature member, said armature member having a ferromagnetic portion thereof extending in spaced relation intermediate said polar structures and in operative relation with said gap, said armature member having a nonmagnetic metallic portion joined with said ferromagnetic portion thereof, means for impressing a variable magnetomotive force longitudinally upon said armature member and including a winding encircling said ferromagnetic portion of said armature member, said polar structures extending beyond the opposite ends of said winding and forming parallel low reluctance magnetic flux paths between the opposite ends of said ferromagnetic armature portion, said nonmagnetic metallic portion of said armature member extending away from said winding, a first contact mounted adjacent to said nonmagnetic metallic portion of said armature member remote from said winding, a second contact movably mounted for engagement with said first contact in accordance with the direction in which said armature member is displaced, and means supporting said armature member for displacement relative to said gap.

6. An electrically actuated contacting device, comprising a hermetic envelope including a base, lead-ins insulatedly sealed through said base, a mounting bracket in said envelope connected to said base and having a pair of oppositely disposed arms extending away from said base, means for producing a substantially constant magnetic field supported remote from said base, an elongated armature member, elongated low reluctance polar structures defining a gap supported in opposed spaced relation along opposite sides of said armature member and juxtaposed to said constant magnetic field producing means between the latter and said armature member, means connected to said bracket arms and supporting said polar structures, said armature member having a ferromagnetic portion thereof extending in spaced relation intermediate said polar structures and in operative relation with said gap, means for impressing a variable magnetomotive force longitudinally upon said armature member and including a winding encircling said ferromagnetic portion of said armature member, said polar structures extending beyond the opposite ends of said winding and forming parallel low reluctance magnetic flux paths between the opposite ends of said ferromagnetic armature portion, said armature member having a nonmagnetic metallic portion connected to said ferromagnetic portion and extending away from said winding toward said base, a first contact mounted adjacent to said base and said nonmagnetic metallic portion of said armature member remote from said winding, a second contact movably mounted for engagement with said first contact in accordance with the direction in which said armature member is displaced, means supporting said armature member for displacement relative to said gap, and means conductively connecting said contacts with said lead-ins.

References Cited in the file of this patent

UNITED STATES PATENTS

| | | |
|---|---|---|
| 2,357,834 | Liefer et al. | Sept. 12, 1944 |
| 2,433,740 | Collins et al. | Dec. 30, 1947 |
| 2,486,394 | Eannarino | Nov. 1, 1949 |
| 2,719,891 | James et al. | Oct. 4, 1955 |
| 2,831,936 | Plice | Apr. 22, 1958 |
| 2,902,561 | Umrath | Sept. 1, 1959 |